United States Patent
Weger et al.

(10) Patent No.: US 9,154,040 B2
(45) Date of Patent: Oct. 6, 2015

(54) DOWN CONVERTER

(71) Applicant: Minebea Co., Ltd, Nagano-ken (JP)

(72) Inventors: Robert Weger, Wels (AT); Mykhaylo Raykhman, Munich (DE)

(73) Assignee: Minebea Co., Ltd., Nagano-ken (JP)

( * ) Notice: Subject to any disclaimer, the term of this patent is extended or adjusted under 35 U.S.C. 154(b) by 232 days.

(21) Appl. No.: 13/709,106

(22) Filed: Dec. 10, 2012

(65) Prior Publication Data

US 2013/0094250 A1 Apr. 18, 2013

(30) Foreign Application Priority Data

Dec. 10, 2011 (DE) .......................... 10 2011 120 805

(51) Int. Cl.
 *H02M 1/42* (2007.01)
 *H02M 3/335* (2006.01)
 *H02M 3/158* (2006.01)

(52) U.S. Cl.
 CPC .......... *H02M 3/33523* (2013.01); *H02M 3/158* (2013.01); *H02M 3/33569* (2013.01); *H02M 1/42* (2013.01)

(58) Field of Classification Search
 CPC ............ H02M 1/34; H02M 2001/346; H02M 2001/348; H02M 2001/342; H02M 2001/344; H02M 2001/0048; H02M 2001/0058
 USPC .................. 363/56.12, 16; 323/262, 263, 271
 See application file for complete search history.

(56) References Cited

U.S. PATENT DOCUMENTS

| | | | |
|---|---|---|---|
| 5,748,457 A * | 5/1998 | Poon et al. ....................... 363/16 |
| 6,538,905 B2 * | 3/2003 | Greenfeld et al. ............... 363/17 |
| 6,621,718 B1 * | 9/2003 | Malik et al. ..................... 363/26 |
| 7,136,293 B2 * | 11/2006 | Petkov et al. .................. 363/126 |
| 7,548,435 B2 * | 6/2009 | Mao .................................. 363/16 |
| 2003/0048645 A1 | 3/2003 | Hosotani et al. |
| 2005/0286272 A1 | 12/2005 | Iwamoto et al. |
| 2007/0025125 A1 | 2/2007 | Nakahori et al. |
| 2010/0246214 A1 | 9/2010 | Nakahori |
| 2010/0259241 A1 | 10/2010 | Cuk |

FOREIGN PATENT DOCUMENTS

| | | |
|---|---|---|
| DE | 9216426 | 4/1993 |
| DE | 102005030601 | 1/2007 |
| DE | 102006041545 | 4/2007 |

* cited by examiner

*Primary Examiner* — Harry Behm
(74) *Attorney, Agent, or Firm* — Volpe and Koenig, P.C.

(57) ABSTRACT

A down converter for converting an input DC voltage (Vin) into a lower output DC voltage (Vout). The down converter has on the primary side (2) an LC series resonance circuit (4) that can be connected via a first switch (S1) to the input voltage (Vin) and via a second switch (S2) to ground. On the secondary side (3), an output switch (S3) and an output capacitor (C) are each connected in parallel to the DC voltage output (Vout) and connected to each other through an inductor (L). The output switch (S3) is connected via a diode (Dr) to the input voltage (Vin) so as to divert voltage overshoots.

11 Claims, 4 Drawing Sheets

DOWN CONVERTER

INCORPORATION BY REFERENCE

The following documents are incorporated herein by reference as if fully set forth: German Patent Application No. DE 10 2011 120 805.8, filed Dec. 10, 2012.

BACKGROUND

The invention is directed to a voltage converter, particularly a down converter, for converting an input DC voltage into a lower output DC voltage.

Such a down converter, also called a step-down converter or buck converter, according to the prior art is shown in FIG. 1 by way of example. The down converter has a primary side 2 having a DC voltage input Vin and a secondary side 3 having a DC voltage output Vout. Disposed on the primary side 2 is an LC series resonance circuit 4 made up of a coil Lr and a capacitor Cr that can be connected via a first switch S1 to the input voltage Vin and via a second switch S2 to ground. On the secondary side 3, an output switch S3 and an output capacitor C are each connected in parallel to the DC voltage output Vout and connected to each other through an inductor L. The switches preferably take the form of field-effect transistors.

Not illustrated is a control unit, such as a microcontroller, that controls the individual switches.

The resonance circuit makes it possible to avoid the losses that occur when switching on S1 in conventional down converters in continuous operation due to the discharge of the parasitic drain-source capacitance of S1. In explaining the function of zero voltage switching, initially S1=ON and S2, S3=OUT. Then the current increases through the choke coils, where Cr is sufficiently large that its voltage only changes slightly in comparison to the input voltage. If S1 is switched off, the current from the energy supplied by the choke coils continues to flow and recharges the parasitic capacitances of S1 and S2 until finally the body diode of S2 is conductive and S2 can be switched on without losses. At this point of time, the voltage at S3 is also close to zero because Lr<<L, so that S3 can also be simultaneously switched on quasi loss-free. L now feeds its residual energy into C, while Lr charges the capacitor Cr. As soon as the energy in Lr is exhausted, the current in Lr changes its direction and increases according to a sine function. The time it takes to reach the current maximum is solely determined by the values of Lr and Cr. As soon as the current is close to maximum, S2 is switched off and the magnetic energy in Lr recharges the parasitic capacitances of S1 and S2, so that S1 can be switched on loss-free. S3 has to be open at the same time S1 is switched on (FIG. 1b). More detailed analysis shows that it is advantageous if S3 is only switched off somewhat later so as to prevent the body diode of S3 from opening. A short ON overlap of S1 and S3 is possible, particularly since Lr limits the increase in current.

Typical operating frequencies lie between 50 kHz and 200 kHz. The OFF time of the half bridge is constant and the level of the output voltage is set via the duty cycle.

This circuit may also be set up using galvanic isolation in accordance with FIG. 2. Here, the primary side having the primary winding of a transformer 5 is connected to a core 6. On the secondary side, an additional capacitor Cr is connected between the secondary winding 8 and the output switch S3.

In the circuit in FIG. 3, in addition to galvanic isolation, the ripple-steering technique is applied in which the choke coil L is disposed on the core of the transformer.

Other embodiments of down converters are known, for example, from WO 2009/158230 A1.

After extensive testing of the circuit according to FIG. 1a, the inventors have now discovered that when switching on the switch S1, strong voltage overshoots occur at switch S3. These oscillations occur in that the parasitic capacitance of the switch S3 together with Lr and Cr form a series resonance circuit having a very high natural frequency. The voltage at S3 thus swings up to double the input voltage. These voltage overshoots pose a threat to the switch S3 which could be damaged by the high voltage. Moreover, the voltage oscillations cause undesired EMC emissions and reduce the efficiency of the voltage converter.

SUMMARY

It is thus the object of the invention to produce a down converter in which no overshoots of this kind occur.

This object has been achieved according to the invention in that the output switch is connected via a diode to another circuit part, particularly to the DC voltage input or the DC voltage output. This allows the excess voltage of the voltage overshoots to be diverted to another component of the circuit. The voltage load on the switch S3 is thereby reduced to the simple input voltage. Oscillation of the parasitic resonance circuit is likewise prevented, so that no additional EMC emissions occur and the efficiency of the voltage converter is not reduced.

The primary side and the secondary side may be connected directly to each other, the LC series resonance circuit, the output switch and the inductor forming a common node. Additionally, the primary side and the secondary side may be galvanically isolated by a transformer, the LC series resonance circuit being directly connected to the primary winding. On the secondary side, the output switch is connected through a capacitor to the secondary winding.

In a first embodiment of the invention, the excess energy is fed into the capacitor of the LC series resonance circuit. For this purpose, it is preferable if the anode of the diode is connected to the output switch or the primary winding of the transformer and the cathode of the diode to the DC voltage input.

In a further embodiment of the invention having galvanic isolation, the excess energy is fed into the input voltage source. For this purpose, the transformer has a second primary winding, one terminal being connected via a capacitor to ground and the other terminal being connected respectively via diodes in a reverse direction to the DC voltage input and to ground.

A further embodiment of the invention provides for the excess energy to be fed into the output capacitor. For this purpose, the anode of the diode is connected to the secondary winding of the transformer and the cathode of the diode to the output capacitor.

It can be additionally expedient if on the cathode side of the diode an additional RC network, consisting of a parallel connection of at least one resistor and at least one capacitor, is connected in series.

In all the galvanic isolated embodiments of the invention, the inductor on the secondary side may also be disposed on the core of the transformer.

BRIEF DESCRIPTION OF THE DRAWINGS

The invention is explained in more detail below on the basis of several embodiments with reference to the enclosed drawings.

The drawings show.

DETAILED DESCRIPTION OF THE PREFERRED EMBODIMENTS

Figure 1A:
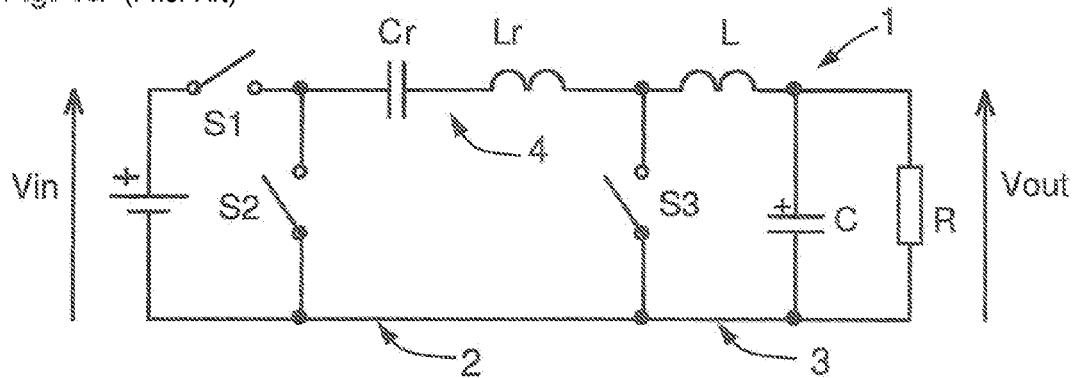
FIG. 1a a down converter according to the prior art having two switches on the primary side and one switch on the secondary side, FIG. 1b the switching sequence of the three switches over time, FIG. 2 the down converter of FIG. 1 having galvanic isolation according to the prior art, FIG. 3 the down converter of FIG. 2 using a ripple-steering technique according to the prior art, FIG. 4 the down converter of FIG. 1 having a current path according to the invention from the output switch via a diode to divert excess energy to the capacitor of the LC series resonance circuit, FIG. 5 the down converter of FIG. 4 having interchanged resonance inductance and resonance capacitance, FIG. 6 the down converter of FIG. 4 having galvanic isolation, FIG. 7 the down converter of FIG. 6 having ripple steering, FIG. 8 a down converter according to the invention having energy feedback in the input source, FIG. 9 the down converter of FIG. 8 in which the resonance inductance is formed by the leakage inductance of the transformer, FIG. 10 the down converter of FIG. 10 having ripple steering, FIG. 11 a down converter according to the invention having galvanic isolation and having energy feedback in the output capacitor, FIG. 12 the down converter of FIG. 11 having ripple steering, FIG. 13 the down converter of FIG. 11 having an additional RC network in the feedback, and FIG. 14 the down converter of FIG. 13 having ripple steering.
Figure 1B:
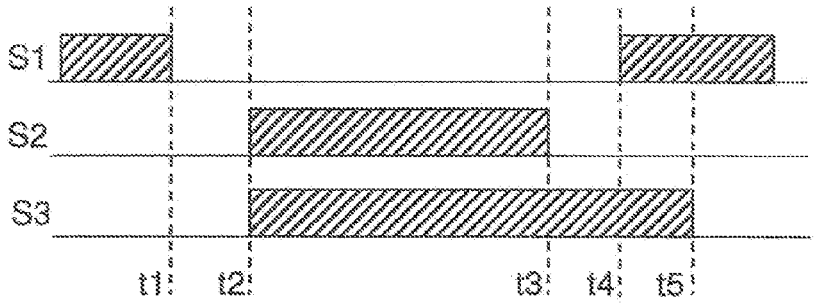
Figure 4:
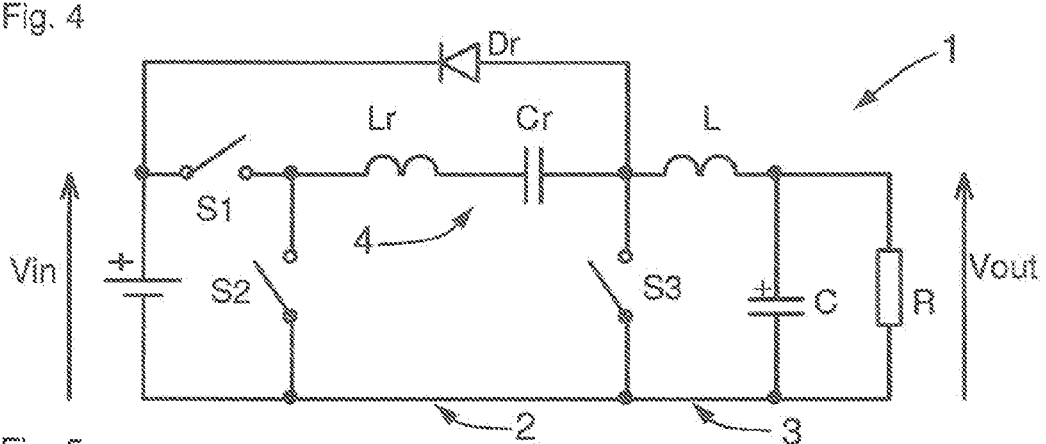

FIG. 4 shows a first embodiment of a voltage converter 1 according to the invention that substantially corresponds to the circuit of FIG. 1a.

In this embodiment, the excess energy is diverted into the capacitor Cr of the LC resonance circuit 4. For this purpose, the anode of a diode Dr is connected to the output switch S3 and the cathode of the diode Dr is connected to the input DC voltage before the switch S1.

Since the voltage overshoots at S3 only occur when S1 is switched on, through this arrangement the diode is also only connected at that time to the LC resonance circuit, so that in the free-running phase no impairment occurs due to the diode Dr.

Figure 5:
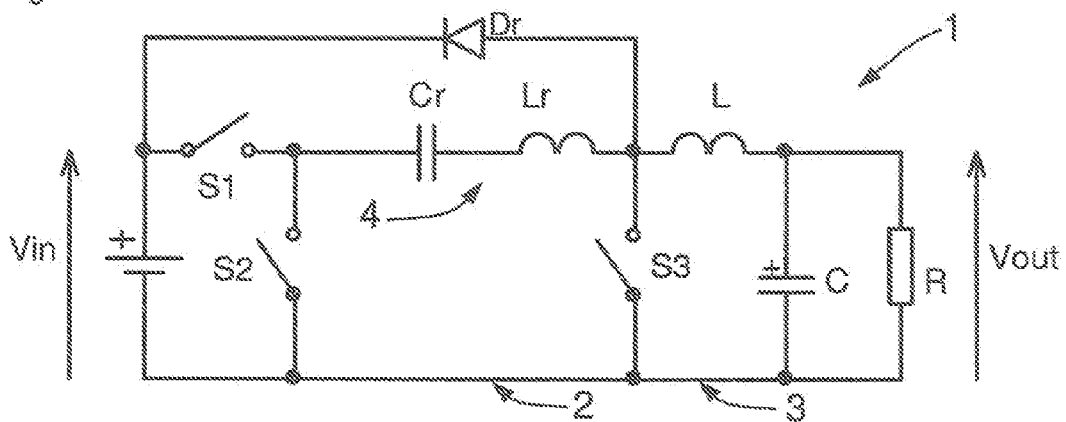

In the illustrated embodiment, the capacitor Cr is positioned first in the LC resonance circuit and the inductor Lr afterwards. The circuit functions without restriction even if the positions of the capacitor Cr and the coil Lr are interchanged as illustrated in FIG. 5.

Figure 2:
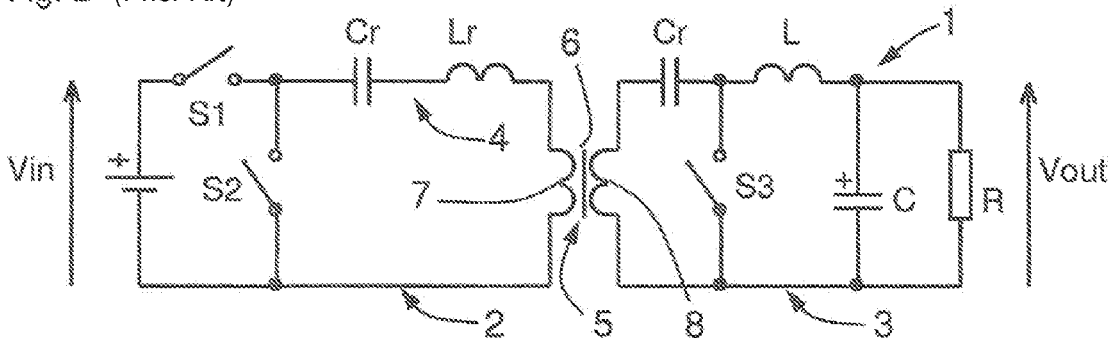
Figure 3:
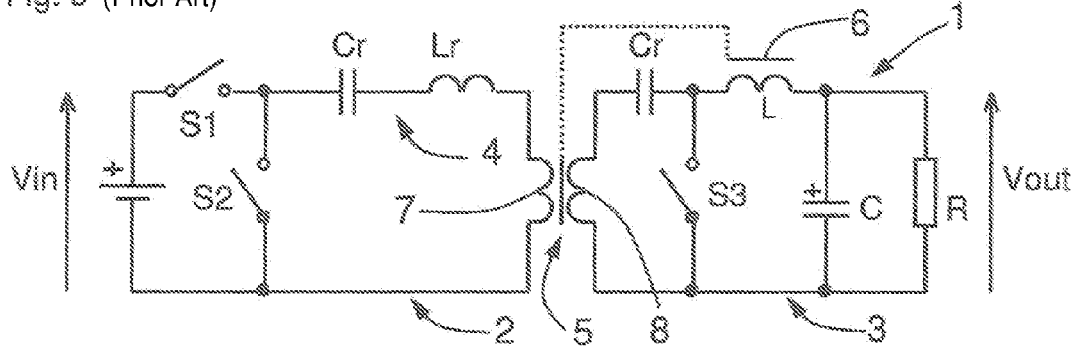
Figure 6:
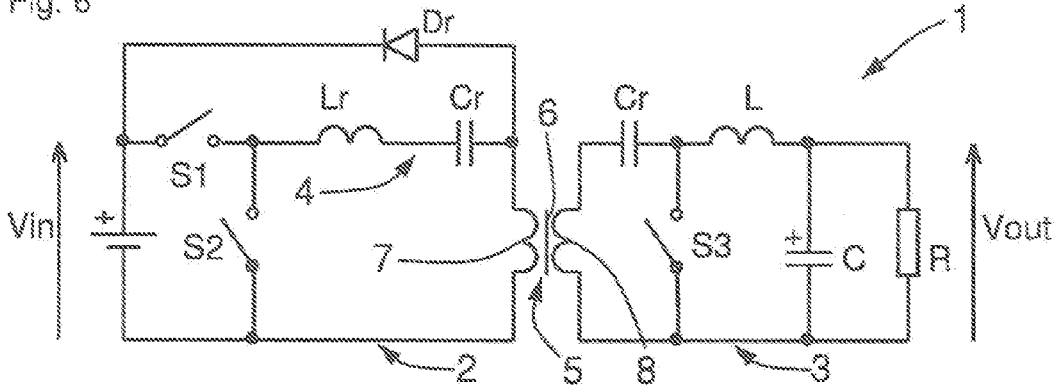

The diversion of voltage peaks according to the invention is also possible for a voltage converter having galvanic isolation in accordance with FIG. 2. A voltage converter 1 of this kind is shown in FIG. 6. Here, the anode of the diode Dr is directly connected to the primary winding 7 of the transformer 5. As in FIG. 4, the cathode is connected to the input voltage Vin.

Figure 7:
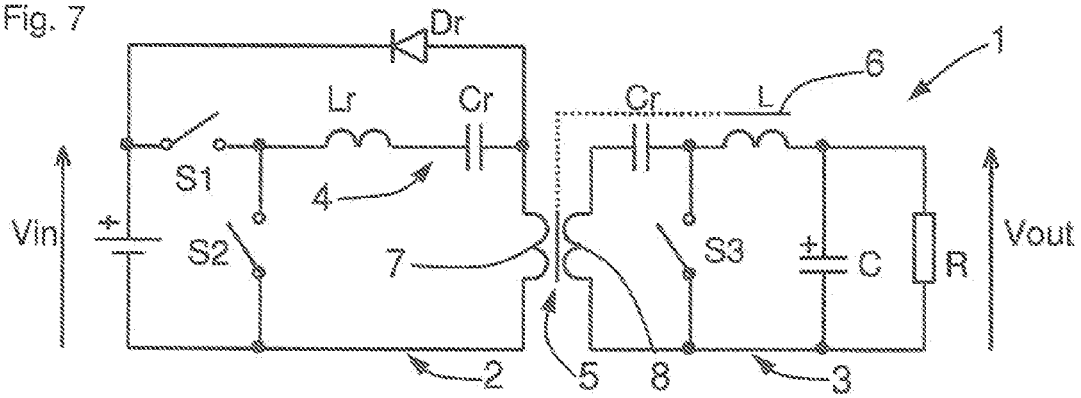

FIG. 7 shows the circuit of FIG. 6 having the ripple-steering technique in which the coil L is disposed on the core 6 of the transformer 5.

Figure 8:
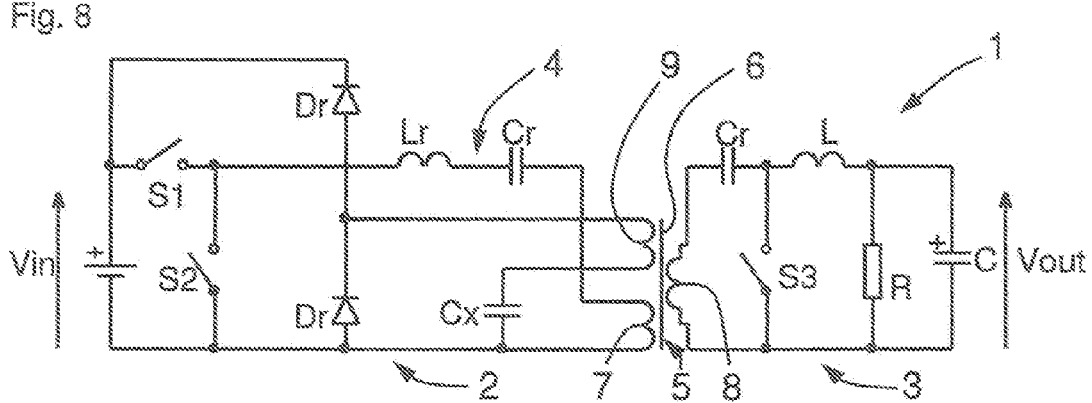

As shown in FIG. 8, it is also possible to divert the excess energy into the input voltage source, or more precisely, into an output capacitor of the voltage source that is virtually always available. For this purpose, the transformer 5 has a second primary winding 9. As in the circuit according to FIG. 6, the LC resonance circuit is connected to the first primary winding 7. The second primary winding 9 is connected on one side via a capacitor Cx to ground. The other pole of the second primary winding 9 is connected respectively via diodes Dr in a reverse direction to the input voltage before the switch S1 and to ground.

Figure 9:
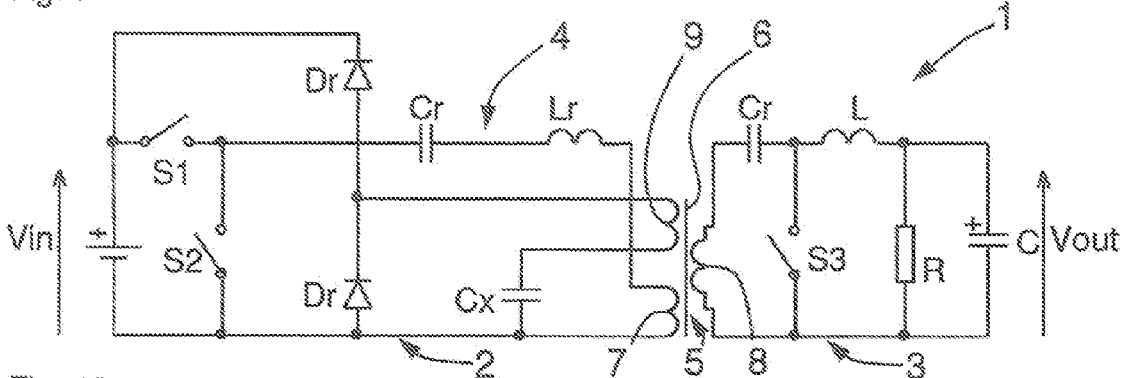

Here again, the positions of the coil Lr and the capacitor Cr may be interchanged as is shown in FIG. 9.

Figure 10:
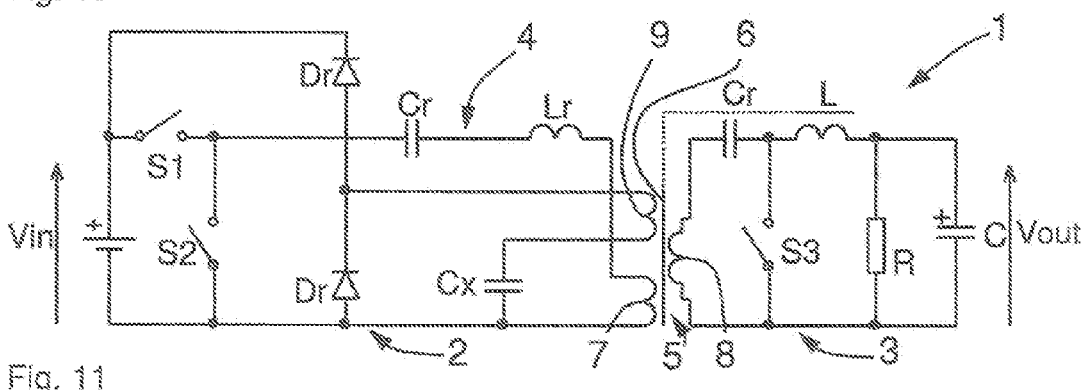

Moreover, the coil L may be disposed on the core 6 as shown in FIG. 10.

Figure 11:
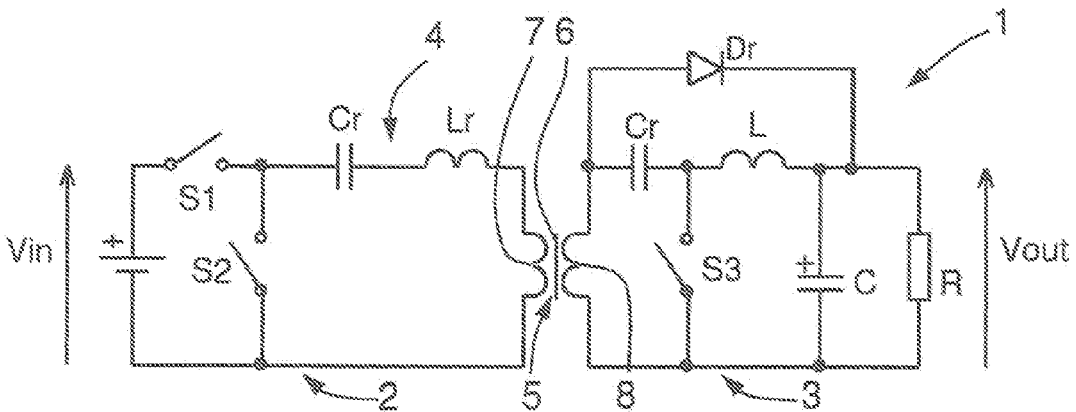

In FIG. 11, a voltage converter having galvanic isolation as in FIG. 2 is shown in which the excess voltage is diverted to the output capacitor C. For this purpose, the anode of a diode Dr is directly connected to the secondary winding and the cathode to the output capacitor C.

Figure 12:
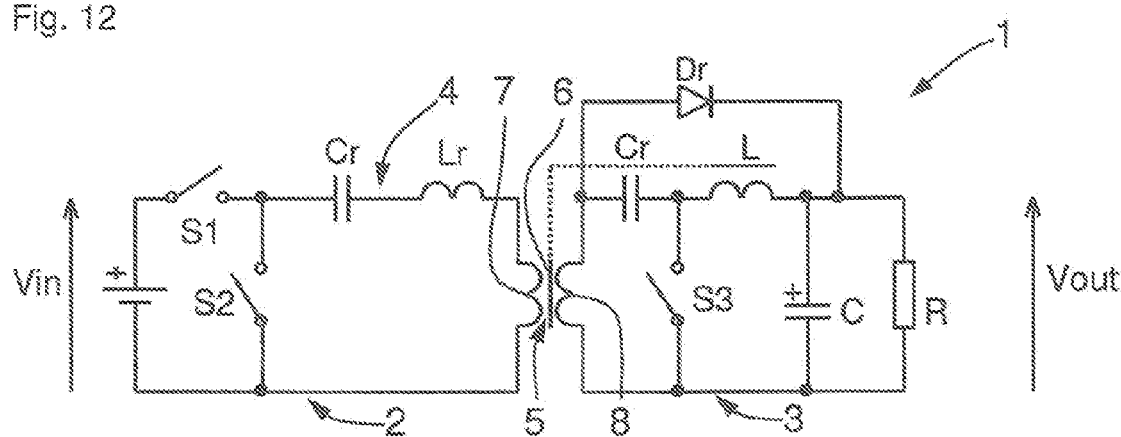

FIG. 12 shows the same voltage converter 1 having ripple steering. This embodiment is particularly advantageous should the inductance Lr be formed by the leakage inductance of the transformer 5 so that the diode Dr cannot be mounted on the input side of the voltage converter 1, as may be the case, for example, in integrated magnetics components.

Figure 13:
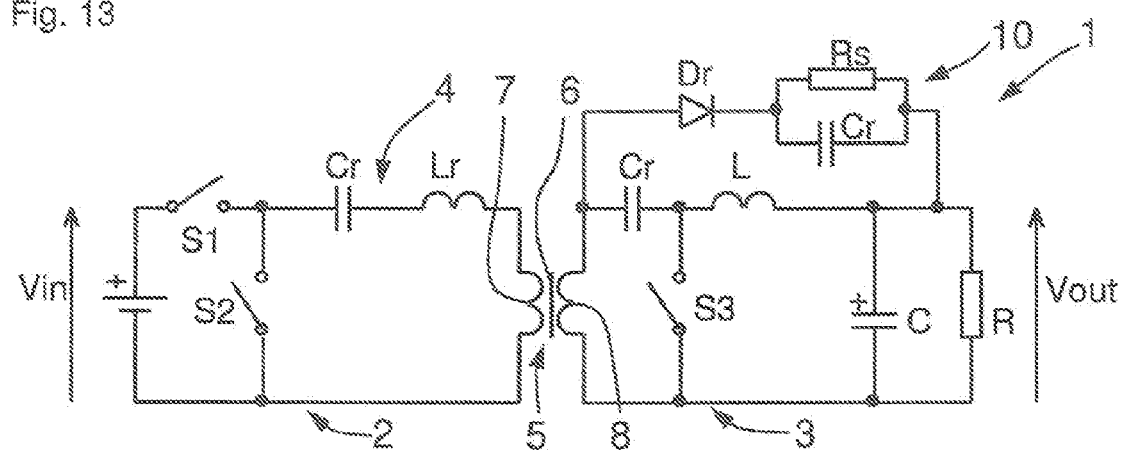
Figure 14:
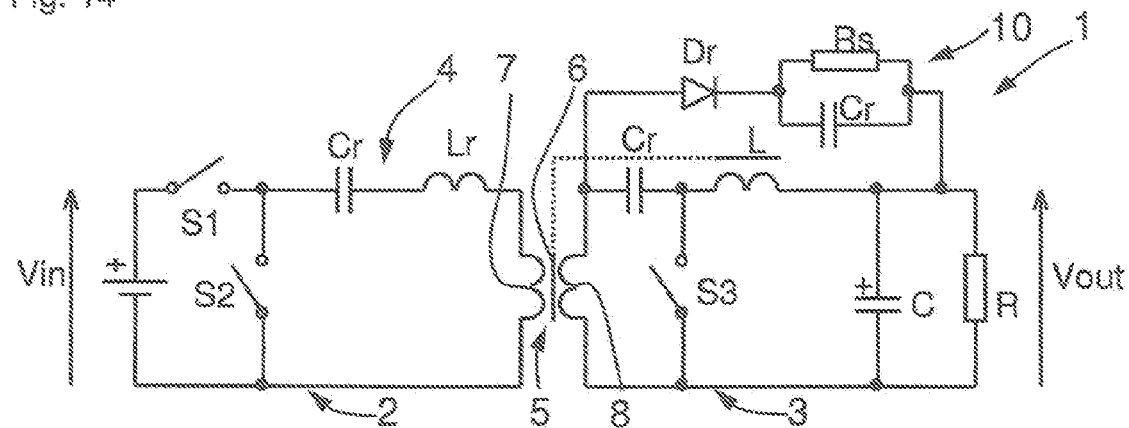

The embodiment shown in FIG. 13 substantially corresponds to that of FIG. 11, where in addition to the diode, an RC network is connected in series here, the RC network being formed by at least one resistor Rs and at least one capacitor Cr connected in parallel. Again this embodiment can be combined with ripple steering as shown in FIG. 14.

It should be noted that a solution having the diode Dr in the output side of the voltage converter 1 only makes sense if the relative switch-on time of the switch S1 is greater than that of the switch S2. If this ratio is lower, then, for example, the RC network shown in FIGS. 13 and 14 could be beneficial, where the resistor Rs acts as a current limiter for lower frequencies while the capacitor Cr provides a low-impedance current path for high frequencies.

In all embodiments it is possible for the position of the coil Lr and the capacitor Cr of the LC series resonance circuit to be interchanged, even if this is not explicitly shown in each case.

IDENTIFICATION REFERENCE LIST

Vin DC voltage input
Vout DC voltage output
S1,S2 Switch primary side
S3 Output switch
Cr Capacitor
Lr Inductor
L Coil (secondary side)
C Output capacitor
R Output load
Rs Resistor RC network
Dr Diode
Cx Capacitor
1 Voltage converter
2 Primary side
3 Secondary side
4 LC series resonance circuit
5 Transformer
6 Transformer core
7 Primary winding
8 Secondary winding 9 Second primary winding
10 RC network

The invention claimed is:

1. A voltage converter (1), comprising a primary side (2) having a DC voltage input (Vin) and a secondary side (3) having a DC voltage output (Vout), wherein an LC series resonance circuit (4) is disposed on the primary side (2) that is connectable via a first switch (S1) to the input voltage and via a second switch (S2) to ground, and wherein on the secondary side (3), an output switch (S3) and an output capacitor (C) are each connected in parallel to the DC voltage output (Vout) and connected to each other through an inductor (L), a diode (Dr) connects the output switch (S3) to another component of the circuit, so that voltage overshoots occurring at the output switch (S3) are diverted to another component of the circuit, wherein a cathode of the diode (Dr) is either connected to the voltage input (Vin) of the circuit or to the output capacitor (C) of the circuit, wherein the diode (Dr) is connected to the output capacitor (C) directly or via a RC network formed by at least one resistor (Rs) and at least one capacitor (Cr) connected in parallel, and the primary side (2) and the secondary side (3) are galvanically isolated through a transformer (5).

2. A voltage converter according to claim 1, wherein the LC resonance circuit (4) is connected directly to a primary winding (7) of the transformer (5) and on the secondary side, the output switch (S3) is connected through the capacitor (Cr) to a secondary winding (8).

3. A voltage converter according to claim 2, wherein excess energy is fed into the capacitor (Cr) of the LC series resonance circuit (4).

4. A voltage converter according to claim 3, wherein an anode of the diode (Dr) is connected to the output switch (S3) or the primary winding (7) of the transformer (5) and the cathode of the diode (Dr) to the DC voltage input (Vin).

5. A voltage converter according to claim 2, wherein excess energy is fed into the input voltage source (Vin).

6. A voltage converter according to claim 5, wherein the transformer (5) has a second primary winding (9), wherein one terminal is connected via a capacitor (Cx) to ground and another terminal is connected respectively via diodes (Dr) in a reverse direction to the DC voltage input (Vin) and to ground.

7. A voltage converter according to claim 1, wherein excess energy is fed into the output capacitor (C).

8. A voltage converter according to claim 7, wherein an anode of the diode (Dr) is connected to the secondary winding (8) of the transformer (5) and the cathode of the diode (Dr) is connected to the output capacitor (C).

9. A voltage converter according to claim 7, wherein on a cathode side or an anode side of the diode (Dr), an additional RC network (10), including a parallel connection of at least one resistor (Rs) and at least one capacitor (Cr), is connected in series.

10. A voltage converter according to claim 1, wherein the inductor (L) is disposed on a core (6) of the transformer (5).

11. A voltage converter according to claim 1, wherein inductance of the series resonance circuit (4) is formed by a leakage inductance of the transformer (5).

* * * * *